UNITED STATES PATENT OFFICE.

DAVID PEPPER, JR., OF PHILADELPHIA, PENNSYLVANIA.

METHOD OF MAKING SECONDARY-BATTERY PLATES.

SPECIFICATION forming part of Letters Patent No. 434,458, dated August 19, 1890.

Application filed March 7, 1890. Serial No. 343,023. (No specimens.)

*To all whom it may concern:*

Be it known that I, DAVID PEPPER, Jr., of the city and county of Philadelphia, State of Pennsylvania, have invented a certain new and useful Improvement in the Manufacture of Electrodes for Primary and Secondary Batteries, of which the following is a true and exact description.

The object of my invention is to produce electrodes fitted for use in primary or secondary batteries and which can be produced both rapidly and cheaply. This I accomplish in the following way, viz: I take a salt or oxide of lead, preferably an oxide, and of the oxide preferably litharge. The salt or oxide of lead must be in a finely-divided condition, preferably a powder, and with this salt or oxide I mix a fusible and soluble salt of an alkaline metal or earth, such as soda, potash, ammonia, or magnesia, or a mixture of two or more of these salts. The proportion of the last-named salts to the salt or oxide of lead should be in the neighborhood of twelve per cent., in the case of nitrate of soda about one to eight, or about twelve per cent., I have found to be best. This percentage, I believe, will be about as low as can be conveniently and advantageously used with my process. The porosity of the plate is increased as the percentage of the fusible and soluble salt is increased. The fusible soluble salts mixed with the salt or oxide of lead should also, of course, be finely divided to enable the mixture to be effected. Having mixed the salts, or salts and oxide, thoroughly, I place the mixture in a mold and heat it to a temperature which will fuse the fusible and soluble salts, then permit it to cool and remove it from the mold in the form of a strong coherent plate, the salt or oxide of lead being thoroughly cemented by the fusible salt in admixture with it, and which in many cases also enters into chemical union with the lead salt or oxide. The plates thus made are converted into electrodes suitable for use in a battery by using them as anodes or cathodes in a suitable electrolyte, such as dilute sulphuric acid. When used as the anode of a primary or secondary battery, the salt or oxide of lead is oxidized to peroxide of lead, or a salt or oxide easily converted into peroxide, and the fusible soluble salt dissolved out and eliminated from the plate during its conversion. When used as the cathode of the battery, the salt or oxide of lead is converted into metallic lead and the fusible soluble salt dissolved and eliminated in the same way. In both cases the plates are left in a thoroughly porous condition and yet strong and coherent.

When my process is applied for the manufacture of the positive plate, the soluble and fusible salt, or salts used in admixture with the salt, salts, or oxide of lead, should preferably be such as will have an oxidizing effect. When heated thus, I prefer to use in the manufacture of such plates a mixture of nitrate of soda eight parts and one or two parts of a salt or salts which have strong oxidizing properties when heated in admixture with the salt or oxide of lead and the fusible salt. Such salts are the chlorates, perchlorates, manganates, and permanganates of soda or potash or ammonia. I prefer to use chlorate of potash. These salts will act upon the salt or oxide of lead when they are heated to fusion, and during this part of the process begin the conversion of the salt or oxide of lead into a peroxide, forming a mixture of red lead and peroxide, and during the subsequent treatment in the bath of the battery the sulphuric acid of the electrolyte acting on the nitrate of soda converts it into free nitric acid and sulphate of soda, the nitric acid uniting with the lead, forming nitrate of lead, which salt is easily convertible into the peroxide of lead, and the sulphate of soda of course dissolving readily. The electrolyte also acts upon the chlorate of potash or similar salt remaining in the mixture, decomposing it into oxygen, free chlorine gas, and sulphate of potash, the free gas acting as a powerful oxidizing agent on the salt of lead and the sulphate of potash dissolving out from the mass. Where a manganate is used, the electrolyte acting upon it liberates oxygen gas, which acts immediately upon the lead salt.

When manufacturing negative plates for batteries, I prefer to use a soluble and fusible salt, which will have a reducing action upon the salt of lead, and can, if desired, and without injury to the plate, mix with the salt an additional reducing agent—such as carbon— a compound easily converted into carbon, or a small proportion of an acetate or oxalate, preferably of lead. The salts which I would prefer for use in the manufacture of the negative plates are the nitrates of soda or potash in admixture with sulphates or chlorides of magnesia, potash, soda, and ammonia, all of which have a reducing action on the salt of lead. The nitrate of soda can, however, be used alone with good results and economically in the manufacture of the negative as well as the positive plates.

The coherent mixture effected by my above-described treatment of the mixed powdered salts or salts and oxides in the mold is amorphous and the salt or oxide of lead preferably never heated to the point of fusion.

The plates made by my method may be provided with connections in any suitable way.

I have mentioned above the use of a lead salt as a substitute for the lead oxide, which I prefer to use in my method of making electrodes. The best salt for my purposes in the manufacture of positive plates is that formed by treating litharge with nitric acid and known as "nitrated lead." Chemically it consists of a mixture of peroxide and lower oxides of lead and nitrate of lead. For the negative plates an organic salt of lead—such as the oxalate or acetate—is well adapted for use.

I am aware that plates have heretofore been made by placing mixtures of oxides and salts similar to some of those mentioned by me in a mold and forming the mixture into a coherent mass by impregnating it with water, which dissolved the salts mixed with the lead oxide and caused them to so combine and mix with the lead oxide as to form a coherent plate suitable for conversion into an electrode, and the water has been introduced to the mixture in the form of steam. My method differs from this in that I effect a fusion of the salts mixed with the lead oxide, and by so doing am enabled to dispense with the presence of water in any form and obtain the production of coherent plates differing in properties and adaptability for use from those obtained by the action of water and without fusion.

Having now described my invention, what I claim as new, and desire to secure by Letters Patent, is—

1. The method of manufacturing plates for conversion into electrodes, which consists in mixing with an oxide or salt of lead a fusible and soluble salt, placing the mixture in a mold and heating it to the point of fusion of the fusible and soluble salt.

2. As a new article of manufacture, a plate suitable for conversion into an electrode composed of an amorphous mass of a lead oxide or salt cemented together by the fusion of a fusible and soluble salt.

3. The method of manufacturing plates suitable for conversion into positive electrodes, which consists in mixing litharge with a fusible soluble and oxidizing salt or mixture of salts, placing the mixture in a mold and heating it to the point of fusion of the fusible and soluble salt.

DAVID PEPPER, JR.

Witnesses:
   LISLE STOKES,
   JOSHUA MATLOCK, JR.